Patented Apr. 11, 1950

2,503,252

UNITED STATES PATENT OFFICE 2,503,252

HALOGENATION OF POLYMERS

Maurice L. Ernsberger, Wilmington, Del., assignor to E. I. du Pont de Nemours & Company, Wilmington, Del., a corporation of Delaware No Drawing. Application June 27, 1947, Serial No. 757,684

12 Claims. (Cl. 260—94.9)

This invention relates to substitution halogenation of high molecular weight hydrocarbon material.

The substitution halogenation of ethylene polymer has heretofore been carried out by reaction of the polymer with free halogen optionally in the presence of halogen carriers, such as aluminum chloride or ferric chloride as described in U. S. 2,183,556. The introduction of substantial amounts of halogen by the latter method requires periods of up to several days.

This invention has as an object an improved process for the chlorination of ethylene polymer. Another object is an improved process for the substitution halogenation of aliphatic polymeric materials which contain a plurality of —$CH_2$— groups. Other objects will appear hereinafter.

These objects are accomplished by the halogenation of an addition polymer containing a plurality of —$CH_2$— groups, particularly ethylene polymer, with a halogen having an atomic number of $18n-1$ where $n$ is an integer from 1 to 2 (i. e. chlorine or bromine), using as a catalyst or initiator for the reaction an azo compound having both valences of the azo group (—N=N—) attached to different carbons at least one of which is a tertiary carbon aliphatic in kind which is in turn joined to a negative monovalent radical, through a carbon of said radical, which latter carbon has its three remaining valences satisfied by elements of atomic number 7 to 8 (i. e. oxygen and nitrogen). The negative monovalent radicals referred to are nitrile, carbonamide, and carbalkoxy groups all of which are hydrolyzable to carboxyl groups.

The ethylene polymers employed in the process of this invention are advantageously the solid high molecular weight polymers of ethylene described in Fawcett et al. U. S. 2,153,553. The process is, however, applicable in general to polymers of ethylene having a molecular weight in excess of 1000.

The following examples in which parts are by weight are illustrative of the invention.

Example I

A solution of 20 parts of ethylene polymer (melting point about 110° C.) in 584 parts of carbon tetrachloride was heated under reflux (about 77° C.) with stirring in an opaque container. Chlorine was passed through the solution at the rate of approximately 0.6 part per minute and 0.4 part of alpha,alpha'-azobis(alpha,gamma-dimethylvaleronitrile) was added. Absorption of chlorine, which was negligible before addition of the azonitrile, increased and amounted to over 0.3 part per minute for approximately an hour after the addition of the azonitrile. The solution was then poured into 800 parts of methanol and the product which separated was further washed with methanol and dried. The yield of chlorinated polymer of ethylene was 42.5 parts and the product had a chlorine content of 53.9%. Films pressed from the product at 120° C. were quite pliable.

In comparison with the above example, Examples 4 and 5 of Fawcett U. S. Patent 2,183,556 indicate that 100 hours is required to obtain a chlorine content of 53.5% under comparable conditions except that no catalyst was employed.

Example II

In an opaque container were placed 480 parts of water and 60 parts of solid ethylene polymer (relative viscosity 1.138 measured at 85° C. using 0.125 gram polymer in 100 cc. of xylene) which was sufficiently fine to pass through a 40-mesh screen. A small amount of dispersant, sodium dodecylsulfate, was added to enable the water to wet the ethylene polymer. The mixture was stirred and the air removed by flushing with nitrogen. Chlorine was passed into the mixture and after 5 minutes, 1.2 parts of alpha,alpha'-azobis(alpha,gamma-dimethylvaleronitrile) was added. Introduction of chlorine into the mixture was continued for one hour, the temperature being maintained at 60–63° C. The product was separated and washed with water, dilute sodium carbonate and finally with water and dried. The yield of chlorinated polymer of ethylene was 70 parts. The product had a chlorine content of 13.6%.

When ethylene polymer is chlorinated in aqueous dispersion in the absence of an azo initiator the rate of chlorine absorption is only about half as rapid.

The azo compounds generically applicable in the process of this invention are aliphatic azo compounds which have both valences of the azo, —N=N—, group attached to different carbons at least one of which is a tertiary aliphatic carbon which is in turn joined to a negative monovalent radical through a carbon of said radical, which latter carbon has its three remaining valences satisfied by elements of atomic number of seven to eight, i. e., oxygen and nitrogen. The negative monovalent radicals are the nitrile, carbalkoxy and carbonamide groups, all of which are hydrolyzable to carboxyl groups.

Examples of the azo catalysts useful in this invention are alpha,alpha'-azobis(alpha,gamma-dimethylvaleronitrile), alpha,alpha'-azodiisobutyronitrile, dimethyl, diethyl, and dihexyl alpha,-alpha'-azodiisobutyrates, alpha,alpha'-azodiisobutyramide, 1,1'-azodicyclohexanecarbonitrile, alpha,alpha'-azobis(alpha - cyclopropylpropionitrile), alpha,alpha'-azobis(alpha-phenylpropionitrile), alpha-(carbamyl-azo)isobutyronitrile, alpha,alpha'-azobis-(alpha-methyl,gamma - carboxybutyronitrile), diethyl alpha,alpha'-azobis-(alpha,gamma-dimethylvalerate), and alpha,-alpha' - azobis(alpha,gamma - dimethylvaleramide).

The more useful azo compounds have nitrile (cyano) groups on the carbons alpha to the azo nitrogens. The radicals which are bonded to the azo nitrogens are generally free from carbon-to-carbon unsaturation, and the more active catalysts have radicals of four to nine carbons attached to each azo nitrogen. The azo compounds are used in the halogenation process of this invention in amounts of 0.005 to 5% based on the total weight of hydrocarbon to be halogenated, although amounts of from 0.1 to 2% usually give a satisfactory rate of reaction. They may be added all at once or portionwise during the reaction.

The halogens particularly useful in the substitution halogenation described in this invention are chlorine and bromine. Halogenating agents such as sulfuryl chloride may also be used. In view of its availability and low cost, chlorine is usually preferred.

While the process of this invention is of particular importance in the chlorination of ethylene polymers, it is applicable in general to addition polymers of molecular weight of 1000 or over and containing a plurality of —CH$_2$— groups, including polyvinyl chloride, rubber, polychloroprene, copolymers of styrene with butadiene and similar aliphatics. In view of the utility of halogenated polymer of ethylene, the chlorination of ethylene polymers constitutes a preferred embodiment of this invention.

The reaction, which takes place in the liquid phase, may be carried out at room temperature or elevated temperatures. In general the temperature employed is that at which the catalyst undergoes decomposition at an appreciable rate. For the azo catalysts, this temperature is usually between 40 and 150° C., although temperatures as high as 200° C. may be employed. Lower temperatures such as below 40° C. to as low as —50° or lower may be used when light of wave length of between 3100 Å and 4000 Å is used in conjunction with the catalyst.

The time of reaction is dependent upon the temperature and the amount of halogenation desired in the product. In general, reaction periods ranging from a few minutes to a few hours, for example five minutes to ten hours, will be employed.

The reaction may be carried out in a solution in which the solvent for the polymer is an inert material, such as carbon tetrachloride, trichloroethylene, and tetrachloroethane, or the polymer may be suspended in a medium, e. g. water, which is essentially non-reactive towards halogen under the conditions employed. In the preparation of highly chlorinated products, e. g. chlorinated polymers of ethylene containing 53 to 63% chlorine, by the solution method the chlorinated polymer may separate from solution but this does not interfere with the chlorination. In contrast, when such chlorinations are carried out using light in place of an azo initiator, chlorination is retarded because the precipitated polymer tends to shut off the light.

The products obtained by the process of this invention are useful in many applications. The specific application depends upon properties of the halogenated material. For example, the halogenated long chain hydrocarbons of high molecular weight are useful as electrical insulators in electrical applications, and as film-forming materials more generally.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the chlorination of ethylene polymer, the improvement wherein there is employed as initiator for the chlorination alpha,alpha'-azobis(alpha,gamma-dimethylvaleronitrile).

2. In the chlorination of ethylene polymer, the improvement wherein there is employed as initiator for the chlorination an aliphatic azo compound having both valences of the azo, —N=N—, group attached to different tertiary aliphatic carbons which carbons are each bonded to a negative monovalent radical through carbon of said radical which latter carbon has its remaining valences satisfied by elements of atomic number of seven to eight.

3. In the chlorination of ethylene polymer in aqueous suspensions, the improvement wherein there is employed as initiator for the chlorination an aliphatic azo compound having both valences of the azo, —N=N—, group attached to different tertiary aliphatic carbons which carbons are each bonded to a negative monovalent radical through carbon of said radical which latter carbon has its remaining valences satisfied by elements of atomic number of seven to eight.

4. In the chlorination of ethylene polymer, the improvement wherein there is employed as initiator for the chlorination an aliphatic azo compound having both valences of the azo, —N=N—, group attached to different tertiary aliphatic carbons which carbons are each bonded to a nitrile group.

5. In the replacement, by halogen of atomic number 18n–1 where n is an integer from 1 to 2, of hydrogen of an addition polymer of molecular weight above 1000 and containing a plurality of —CH$_2$— groups, the improvement wherein there is employed as initiator for the halogenation alpha,alpha' - azobis(alpha,gamma - dimethyl - valeronitrile).

6. In the replacement, by halogen of atomic number 18n–1 where n is an integer from 1 to 2, of hydrogen of an addition polymer of molecular weight above 1000 and containing a plurality of —CH$_2$— groups, the improvement wherein there is employed as initiator for the halogenation an aliphatic azo compound having both valences of the azo, —N=N—, group attached to different tertiary aliphatic carbons which carbons are each bonded to a negative monovalent radical through carbon of said radical which latter carbon has its remaining valences satisfied by elements of atomic number of seven to eight.

7. In the replacement, by halogen of atomic number 18n–1 where n is an integer from 1 to 2, of hydrogen of an addition polymer of molecular weight above 1000 and containing a plurality of —CH$_2$— groups, the improvement wherein there is employed as initiator for the halogenation an aliphatic azo compound having both valences of the azo, —N=N—, group attached to different tertiary aliphatic carbons which carbons are each bonded to a nitrile group.

8. In the replacement, by halogen of atomic number $18n-1$ where $n$ is an integer from 1 to 2, of hydrogen of an addition polymer of molecular weight above 1000 and containing a plurality of —$CH_2$— groups, the improvement wherein there is employed as initiator for the halogenation an aliphatic azo compound having both valences of the azo, —N=N—, group attached to carbons at least one of which is a tertiary aliphatic carbon which is in turn joined to a negative monovalent radical, through a carbon of said radical, which latter carbon has its three remaining valences satisfied by elements of atomic number seven to eight.

9. In the replacement, by halogen of atomic number $18n-1$ where $n$ is an integer from 1 to 2, of hydrogen of an addition polymer of molecular weight above 1000 and containing a plurality of —$CH_2$— groups, the improvement wherein there is employed as initiator for the halogenation an azo compound having both valences of the azo, —N=N—, group attached to different carbons at least one of which is a tertiary carbon aliphatic in character which is in turn joined to a negative monovalent radical, through a carbon of said radical, which latter carbon has its three remaining valences satisfied by elements of atomic number seven to eight.

10. In the replacement, by halogen of atomic number $18n-1$ where $n$ is an integer from 1 to 2, of hydrogen of ethylene polymer, the improvement wherein there is employed as initiator for the halogenation alpha,alpha' - azobis(alpha, - gamma-dimethylvaleronitrile).

11. In the replacement, by halogen of atomic number $18n-1$ where $n$ is an integer from 1 to 2, of hydrogen of ethylene polymer, the improvement wherein there is employed as initiator for the halogenation an aliphatic azo compound having both valences of the azo, —N=N—, group attached to different tertiary aliphatic carbons which carbons are each bonded to a nitrile group.

12. In the replacement, by halogen of atomic number $18n-1$ where $n$ is an integer from 1 to 2, of hydrogen of ethylene polymer, the improvement wherein there is employed as initiator for the halogenation an aliphatic azo compound having both valences of the azo, —N=N—, group attached to different tertiary aliphatic carbons which carbons are each bonded to a negative monovalent radical through carbon of said radical, which latter carbon has its remaining valences satisfied by elements of atomic number of seven to eight.

MAURICE L. ERNSBERGER.

No references cited.